Sept. 25, 1923.

T. FLEISHMAN

AUTOMOBILE FENDER

Filed June 28, 1923

1,468,940

Patented Sept. 25, 1923.

1,468,940

UNITED STATES PATENT OFFICE.

THEODORE FLEISHMAN, OF BALTIMORE, MARYLAND.

AUTOMOBILE FENDER.

Application filed June 28, 1923. Serial No. 648,190.

*To all whom it may concern:*

Be it known that I, THEODORE FLEISHMAN, a citizen of the United States, residing at Baltimore city, State of Maryland, have invented certain new and useful Improvements in Automobile Fenders, of which the following is a specification.

This invention relates to fenders for use in connection with automobiles, one of the objects being to provide a simple and compact structure that can be applied readily to a machine and which, when in normal position, is located back of the front bumper where it will be practically unnoticed.

Another object is to provide means whereby the fender will be dropped quickly to active position when released by the driver, thereby preventing a person who has been struck, from going under the machine.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit of the invention as claimed.

In the accompanying drawings the preferred form of the invention has been shown.

In said drawings

Figure 1:
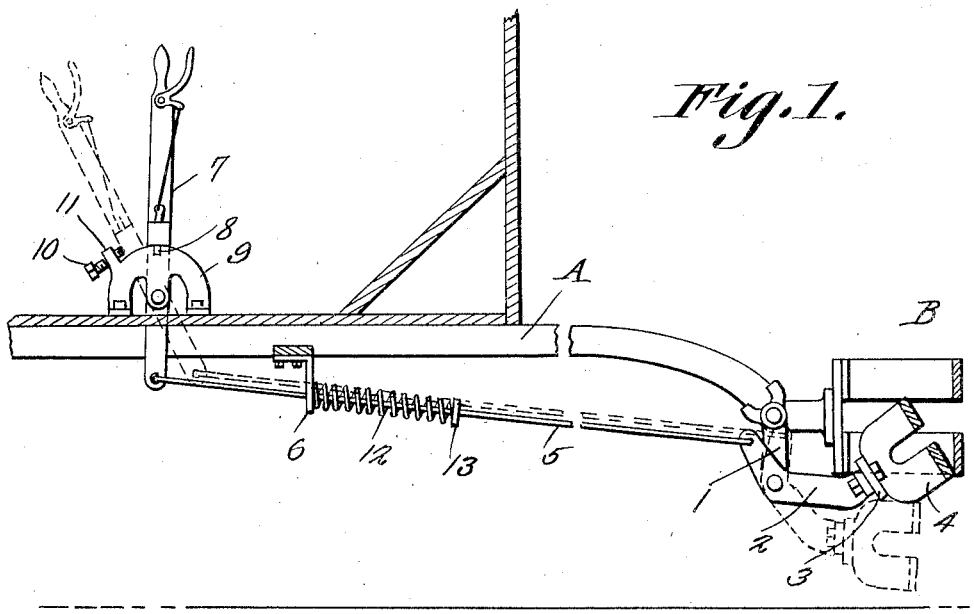
Figure 1 is a vertical longitudinal section through a bumper and a portion of a vehicle having the present invention combined therewith.
Figure 2:
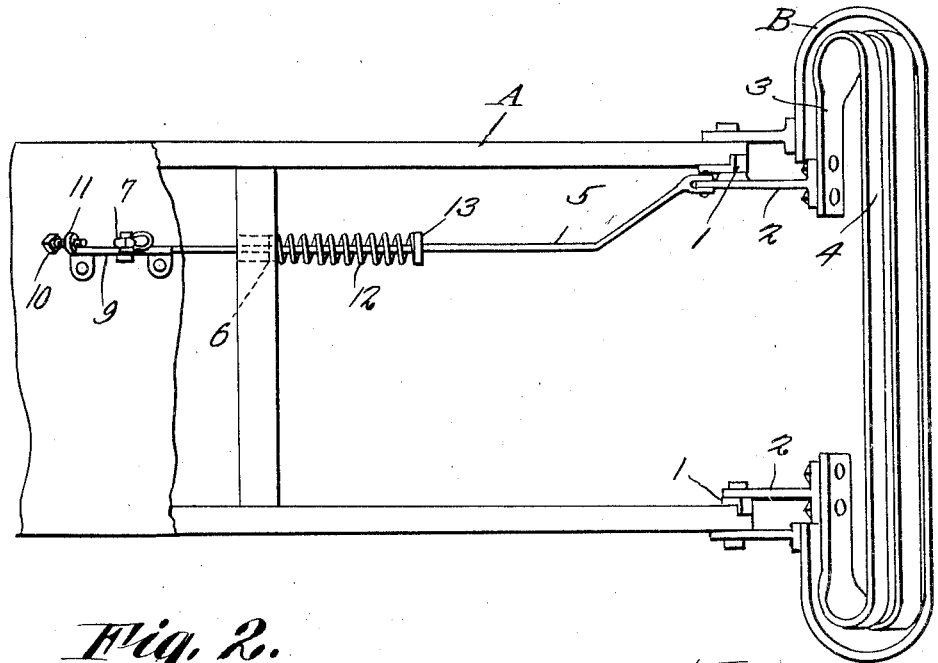
Figure 2 is a plan view of the structure shown in Figure 1.

Referring to the figures by characters of reference A designates a portion of the chassis of a vehicle provided with a bumper B of the usual or any preferred construction. Hangers 1 are connected to the chassis or other convenient supporting structure and pivotally connected thereto are levers 2 each of which is connected at one end to the inturned end 3 of a resilient fender strip 4 that is normally positioned behind the fender B so as to be practically concealed thereby. It will be noted also that the raised fender contacts with the bumper, thereby serving as a reinforcement therefor. The fender can be shaped like an elongated loop with spaced upper and lower portions as shown. The rear end of one of the levers 1 is pivotally connected to a rod 5 mounted in a suitable guide 6 and connected to a lever 7. This lever carries a dog 8 adapted normally to engage a notched segment 9 so as to hold the lever against movement and secure the fender in raised position. Movement of the lever in one direction is limited by a stop screw adjustably mounted at 10 in a finger 11 extending from the segment. A spring 12 is mounted on the rod 5 and bears at one end against the guide 6 and at its other end against the collar 13 carried by the rod. This spring is under compression when the fender is fastened in raised position.

It will be apparent that when the driver of the vehicle releases the lever 7 from the segment 9 the spring 12 will throw the fender downwardly below the bumper and thus prevent the vehicle from running over a person in the path thereof. The downward movement will be limited by the lever coming against the screw 10 and this screw can be adjusted to vary such movement.

It will be seen that the device is very simple, can be applied readily to a machine, and will operate efficiently as a safeguard against running over persons, small animals, etc.

What is claimed is:—

1. The combination with a vehicle having a bumper, of hangers, levers connected thereto, a resilient fender carried by the levers, a hand lever, a connection between the hand lever and one of the fender levers, and a spring for shifting the fender to active position beneath the bumper when the hand lever is released.

2. The combination with a vehicle having a bumper, of a hand lever, adjustable means for limiting the movement thereof in one direction, a fender movably mounted back of the bumper, a connection between the fender and the hand lever, and spring means for lowering the fender and shifting the hand lever, when released, against the limiting means.

In testimony whereof I affix my signature.

THEODORE FLEISHMAN.